United States Patent [19]
Brandenstein et al.

[11] Patent Number: 4,818,124
[45] Date of Patent: Apr. 4, 1989

[54] PIVOT MOUNTED ROLLER

[75] Inventors: Manfred Brandenstein, Eussenheim; Horst M. Ernst, Eltingshausen; Roland Haas, Hofheim; Günter Neder, Schweinfurt; Josef Stork, Gerolzhofen, all of Fed. Rep. of Germany

[73] Assignee: SKF GmbH, Schweinfurt, Fed. Rep. of Germany

[21] Appl. No.: 165,632

[22] Filed: Mar. 8, 1988

[30] Foreign Application Priority Data

Mar. 21, 1987 [DE] Fed. Rep. of Germany ....... 3709343

[51] Int. Cl.$^4$ .............................................. F16C 23/04
[52] U.S. Cl. ..................................... 384/208; 384/215; 384/908
[58] Field of Search ............... 384/208, 215, 908, 206, 384/209, 207, 418, 419

[56] References Cited

U.S. PATENT DOCUMENTS

| | | | |
|---|---|---|---|
| 2,711,352 | 6/1955 | Hasko et al. | 384/208 |
| 4,564,300 | 1/1986 | Schulze | 384/215 |
| 4,718,780 | 1/1988 | Trudeau | 384/908 |
| 4,747,810 | 5/1988 | Shepley et al. | 384/206 |

Primary Examiner—Lenard A. Footland
Attorney, Agent, or Firm—Rosen, Dainow & Jacobs

[57] ABSTRACT

The non-rotating bearing ring of a pivot mounted roller is mounted to be radially movable on an undulated spring and axially held between two machine parts. Friction is produced by relative radial movement between the end surface of the bearing ring and the radially extending surfaces of the machine parts, to result in damping by dissipation of energy. The rubbing surfaces can be coated with friction layer or a solid sliding washer can be employed instead of a coated surface.

5 Claims, 1 Drawing Sheet

PIVOT MOUNTED ROLLER

BACKGROUND OF THE INVENTION

This invention relates to a pivot mounted roller, and is more in particular directed to an improved mounting arrangement for the bearing of a pivot mounted roller adapted for the guiding of a transmisson belt.

A roller of this type is disclosed in DE-OS 2 834 979. In this reference a roller is provided in a tension roller assembly, the roller being mounted on a support via an undulated spring. As a consequence, the tension roller can radially resiliently yield and adapt itself for the purpose of equalizing tension variations of the transmission belt. Oscillation of the spring is brought on, however, by vibration and impulse shocks of the transmission belt, since the spring serves only an energy storing function. This has disadvantageous effects in the guiding of the belt, and especially in the production of noise.

SUMMARY OF THE INVENTION

The invention is directed to the provision of a pivot mounted roller of the above type wherein self oscillation and vibration of the transmission belt are effectively prevented.

In accordance with the invention this object is attained by the provision of an arrangement wherein the bearing ring is positioned between friction surfaces on radially extending surfaces of machine parts provided on the support.

The axial clamping of the bearing ring by friction surfaces results in, on the one hand, guiding of the roller in a desirable manner with greater reduction of all axial movement to enable the precise guiding of the transmission belt in use as a tension roller. On the other hand the sliding friction on the friction surfaces results in an effective damping of the radial movement with respect to the support, to effect energy dissipating damping. Thereby oscillations are immediately further suppressed at their onset. Oscillations of small amplitude and minimum energy effectively do not occur. In the simplest embodiment the bearing ring is clamped on the support between two ring or flange shaped machine components. Axial positioning can be provided in a positive manner by guard rings and/or by edges of the support or the like. As a result the elasticities of the materials of the individual components contributes to satisfactory reproducability of the amount of damping. The arrangement in accordance with the invention is universally adapatable and suitable for spring mounted rollers of all types.

In accordance with a further feature of the invention an axially acting spring is provided to effect the clamping. This arrangement is advantageous since relatively stiff and stable individual parts can be used, whose inherent material elasticity is no longer required to compensate for tolerances expected during assembly. The spring can act on one of the friction surfaces itself, or alternatively a further washer with precise friction surfaces may be provided for this purpose and arranged between the inner ring and the spring.

In a further feature of the invention, at least one of the friction contact surfaces is coated with a friction layer, i.e. a layer of a material that does not permit frictionless sliding. A thin layer of plastic material with more or less good friction characteristics may thus be provided on the friction contact surface, whereby in particular the value of starting friction can be optimized in the region of friction at rest.

In a still further embodiment of the invention a friction washer can be arranged between the end of the bearing ring and the spring. The friction washer can be of a material with special friction characteristics, and due to its compact constructional form constitutes an alternative to the use of the friction layer, as well as the embodiment of the invention employing a friction layer and a friction washer with friction surface. Here also, however, when necessary it can be combined with a further metal washer.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

Figure 1:
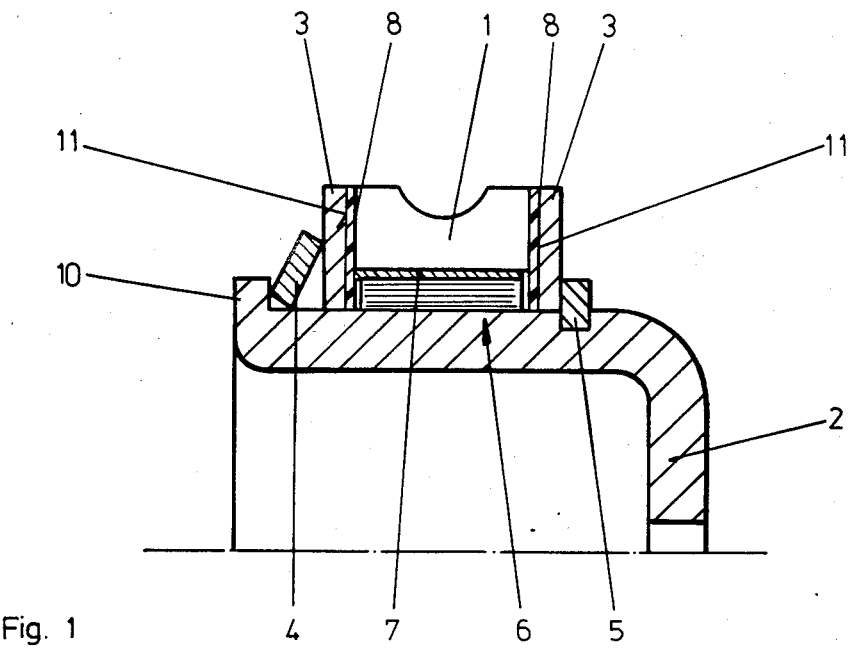
FIG. 1 is a partial cross sectional view of a radially resilient roller with a coated washer, in accordance with one embodiment of the invention.

The example illustrated in FIG. 1 shows only the essential elements of a pivot mounted roller. Conventional roller elements, such as roller outer surfaces and further bearing components, although necessary components of a functional structure, have been omitted in order to simpify the disclosure, the functions of such other components not changed by the arrangement of the invention.

FIG. 1 is a cross sectional view, in a radial plane, of a portion of a pivot bearing roller in accordance with the invention, comprised of an inner bearing ring 1 having a race for receiving rolling elements such as balls (not shown), a cup shaped support 2, a pair of washers 3 on the outer periphery of the support 2 on opposite sides of the inner bearing ring 1, a spring 7 that may be generally annular with radially directed waves or undulations, and a holding or guard ring 5 for axially holding the inner ring 1. The bore of the inner ring 1 is larger in diameter than the outer surface of the support 2, thereby providing an annular space in which the undulated spring 7 is installed. The spring 7 radially resiliently supports the inner ring. Relative radial movement of the inner ring 1 toward the support to as close as the wall thickness of the undulated spring 7, is thereby possible. The axial positioning of the inner ring 1 is effected by the metal washers 3 which abut the opposite ends 11 of the inner ring 1. At least the sides of the washers 3 toward the ends 11 are coated with thin friction layers 8 of plastic material, for example Teflon. The washer 3 illustrated on the right in FIG. 1 abuts the side of the guard ring 5, which in turn is held in a groove of the support 2. This washer 3 is thereby positioned in a positive manner in the axial direction. An axially acting Belleville washer 4 is provided at the other end of the inner ring 1, the washer 4 extending between a radial flange 10 of the support 2 and the washer 3 illustrated at the left in the drawing, thereby resiliently urging this washer 3 with prestress against the inner bearing ring. The inner ring 1 is thereby held in a positive manner in both axial directions. A strong sliding friction is produced upon radial movement of the inner ring 1 between the side surfaces 11 of the inner ring 1 and the friction layer 8 of the washers 3 and thereby the support 2. Kinetic energy corresponding to the damping of the radial movement is dissipated in this manner.

Figure 2:
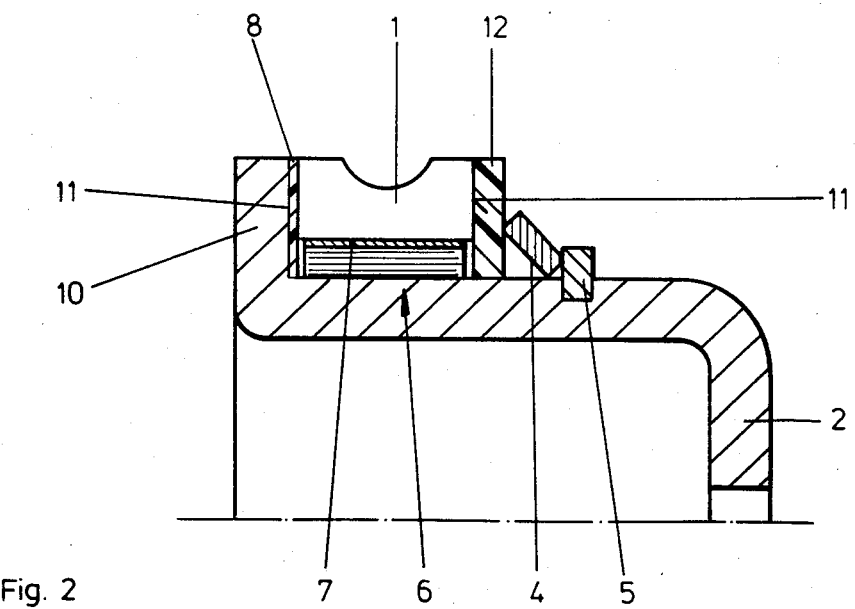
FIG. 2 is a partial cross sectional view of a radially resilient roller with a friction washer, in accordance with a further embodiment of the invention.

In the embodiment of the invention illustrated in FIG. 2, the friction layer 8 is applied directly to the radial flange 10 formed unitarily on the support 2, one end of the bearing ring 1 abutting this layer 8. A massive (solid) friction washer 12, for example of wear resistant material, is mounted to abut the other end of the inner ring 1, the washer comprising a friction surface for the inner ring 1. The friction washer 12 is pressed against the inner ring by the Belleville washer 4, extending between the washer 12 and the guard ring 5.

While the invention has been disclosed and described with reference to two embodiments thereof, it will be apparent that variations and modification may be made therein. Thus, there are many possible combinations of friction surfaces, friction washers and engaging surfaces for damping the radial movement. For example, the coating of the end surfaces of the inner ring with a friction layer constitutes a practical embodiment of the invention, in which case the layers on the other components may be omitted if desired. It is therefore intended in the following claims to cover each such variation and modification as falls within the true spirit and scope of the invention.

What is claimed is:

1. In a pivot mounted roller assembly comprising a support, a bearing having a non-rotating bearing ring, and a radially acting spring between the non-rotating bearing ring and the support, the improvement comprising first and second machine parts on said support, and means for axially prestressing the bearing ring between radially extending surfaces of said first and second machine parts, at least one surface at the abutment of said ends of the bearing ring and the radially extending surfaces comprising a friction contact surface.

2. The pivot mounted roller of claim 1 wherein said prestressing means comprises an axially acting spring.

3. The pivot mounted roller of claim 1 wherein said friction contact surface comprises a coating of a friction layer on one of the surfaces at said abutment.

4. The pivot mounted roller of claim 1 wherein said first machine part comprises a friction washer extending between an end surface of the bearing ring and said prestressing means, said friction contact surface comprising a surface of said friction washer.

5. The pivot mounted roller of claim 1 wherein said first machine part comprises a radial flange of the support engaging one end of said bearing ring and said second machine part comprises a friction washer, said prestressing means comprising a spring urging said friction washer toward the other end of the bearing ring.

* * * * *